(12) United States Patent
Delrossi

(10) Patent No.: US 10,963,829 B2
(45) Date of Patent: Mar. 30, 2021

(54) COMPUTER SYSTEM AND METHOD FOR CONTROLLING DEFINITION INTERFACES OF A VALUE METER ON A DISPLAY

(71) Applicant: ORACLE INTERNATIONAL CORPORATION, Redwood Shores, CA (US)

(72) Inventor: Joseph E. Delrossi, West Chester, PA (US)

(73) Assignee: Oracle International Corporation, Redwood Shores (CA)

( * ) Notice: Subject to any disclaimer, the term of this patent is extended or adjusted under 35 U.S.C. 154(b) by 615 days.

(21) Appl. No.: 15/399,016

(22) Filed: Jan. 5, 2017

(65) Prior Publication Data

US 2018/0189707 A1 Jul. 5, 2018

(51) Int. Cl.
*G06Q 30/00* (2012.01)
*G06Q 10/06* (2012.01)
*G06F 16/33* (2019.01)

(52) U.S. Cl.
CPC ....... *G06Q 10/06375* (2013.01); *G06F 16/33* (2019.01); *G06F 2216/03* (2013.01)

(58) Field of Classification Search
CPC ......... G06Q 10/06375; G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| 7,925,594 | B2 | 4/2011 | Jaligama et al. |
| 8,095,415 | B1 | 1/2012 | Thomas et al. |
| 8,374,899 | B1 | 2/2013 | Heuler et al. |

(Continued)

OTHER PUBLICATIONS

Froimson et al., Bundled payments for care improvement initiative: the next evolution of payment formulations: AAHKS Bundled Payment Task Force, 2013. (Year: 2013).*

(Continued)

*Primary Examiner* — Patricia H Munson
*Assistant Examiner* — Uche Byrd
(74) *Attorney, Agent, or Firm* — Kraguljac Law Group, LLC

(57) ABSTRACT

Systems, methods, and other embodiments associated with defining and evaluating a project initiative are described. In one embodiment, a method includes displaying an initiative definition interface for use in defining the project initiative for an entity. The example method may also include receiving an objective definition, a capability definition, a benefit definition, and an implementation roadmap definition through the initiative definition interface. The example method may also include assigning ranks to the objective definition, the capability definition, the benefit definition, and the implementation roadmap definition based upon a definition completeness metric. The example method may also include generating an initiative viability score based upon the ranks. The example method may also include displaying an initiative redefinition suggestion for redefining the project initiative based upon the initiative viability score being below a threshold.

19 Claims, 7 Drawing Sheets

(56) References Cited

U.S. PATENT DOCUMENTS

| | | | |
|---|---|---|---|
| 2003/0135399 A1* | 7/2003 | Ahamparam | G06Q 10/06313 705/7.28 |
| 2004/0148566 A1* | 7/2004 | Jaffar | G06F 17/246 715/215 |
| 2005/0065841 A1 | 3/2005 | Middleton | |
| 2005/0080654 A1 | 4/2005 | Huang et al. | |
| 2005/0137950 A1 | 6/2005 | Palozzi et al. | |
| 2006/0010418 A1* | 1/2006 | Gupta | G06Q 10/06 717/101 |
| 2008/0320509 A1 | 12/2008 | Gustafson et al. | |
| 2009/0070771 A1* | 3/2009 | Yuyitung | G06Q 10/06 718/105 |
| 2012/0101883 A1* | 4/2012 | Akhter | G06Q 30/0215 705/14.17 |
| 2012/0129145 A1 | 5/2012 | Miller et al. | |
| 2015/0149247 A1* | 5/2015 | Kramskaia | G06N 5/04 705/7.31 |

OTHER PUBLICATIONS

Tata Consultancy Services, Linking Transformational Initiatives to Desired Business Outcomes: Leveraging a Business-Metrics Driven Framework—White Paper—pp. 1-10, 2015; downloaded from: http://www.tcs.com/SiteCollectionDocuments/White-Papers/BPS-business-metrics-framework-transformational-initiatives-1015-1.pdf.

Uyen Dang, The Camel Rating System in Banking Supervision—A Case Study, 2011—pp. 1-47 (includes appendix), Arcada University of Applied Sciences, International Business; downloaded from: http://www.theseus.fi/bitstream/handle/10024/38344/Dang_Uyen.pdf?...1.

Enterprise Agility, Business Analysis Capability Assessment, pp. 1-6 printed Dec. 2016; downloaded from: http://www.enterprise-agility.com/services/downloads/SD_BusAnalysisCapAssess.pdf.

Mark Synek, How to Assess and Sequence Your Sales Initiatives, pp. 1-4, Dec. 19, 2013—downloaded from: https://salesbenchmarkindex.com/insights/how-to-assess-and-sequence-your-sales-initiatives/.

* cited by examiner

COMPUTER SYSTEM AND METHOD FOR CONTROLLING DEFINITION INTERFACES OF A VALUE METER ON A DISPLAY

BACKGROUND

A business may embark on various project initiatives to improve the business, such as to reduce costs, improve operations, mitigate risk, increase revenue, etc. For example, the business can undertake a technology project initiative, such as the purchase of new accounting software to eliminate reliance on an outside accounting firm. Unfortunately, manually defining project initiatives is a time consuming process that can result in a project initiative that is rejected or one that merely gains marginal support from leadership of the business. Such an inefficient path of project initiative definition can lead to wasted computing resources and time otherwise devoted to creating effective project initiative definitions.

A user defining a project initiative can lack adequate information used to fully define the project initiative. For example, the user may lack information relating to how the project initiative achieves objectives of the business, what future capabilities are needed for the project initiative to achieve the objectives, benefits and justifications for making changes to reach the future capabilities, and/or an implementation roadmap of phases for achieving the project initiative. Thus, it is desirable to provide computer assisted and computer automated functionality for defining project initiatives, ranking project initiatives, acquiring missing information, and providing feedback on the viability of project initiatives.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for an initiative definition interface and an initiative evaluation module for defining and evaluating project initiative definitions. Such systems and methods control definition interfaces, such as the initiative definition interface, of a value meter on a display. The initiative definition interface is provided to a user through a computing device in order to aid the user in defining a project initiative, such as a technology initiative to purchase new sales software for a business. The initiative evaluation module, such as through the value meter, evaluates the project initiative and assigns ranks to definitions of the project initiative. In one embodiment, ranks may be assigned to an objective definition, a capability definition, a benefit definition, and an implementation roadmap definition for the project initiative. The ranks are based upon a level of detail and completeness of information specified for each definition. In this way, an initiative viability score is generated based upon the ranks and is provided through the initiative definition interface.

In one embodiment, the initiative evaluation module performs automated data mining operations, such as data mining of a website, a database, financial statements, documents, and/or other data sources in order to acquire definition data. The acquired definition data is then used to supplement user supplied definition data used to define the project initiative. The initiative evaluation module provides various suggestions based upon the evaluation of the project initiative. In one embodiment, the initiative evaluation module can provide an initiative redefinition suggestion suggesting that the user should provide additional details regarding a particular definition that is lacking adequate details. The initiative evaluation module can provide a notification of an information gap for a certain definition and a suggestion of an action plan to acquire additional details to fill the information gap. In this way, the user can efficiently define the project initiative such as where automated data mining is performed to retrieve useful information, feedback is provided to the user regarding how to update/redefine the project initiative, etc. Automated and computerized aid in defining project initiatives will reduce wasted computing resources and/or time otherwise wasted in manually defining ineffective project initiatives that could be rejected or receive marginal support.

Figure 1:
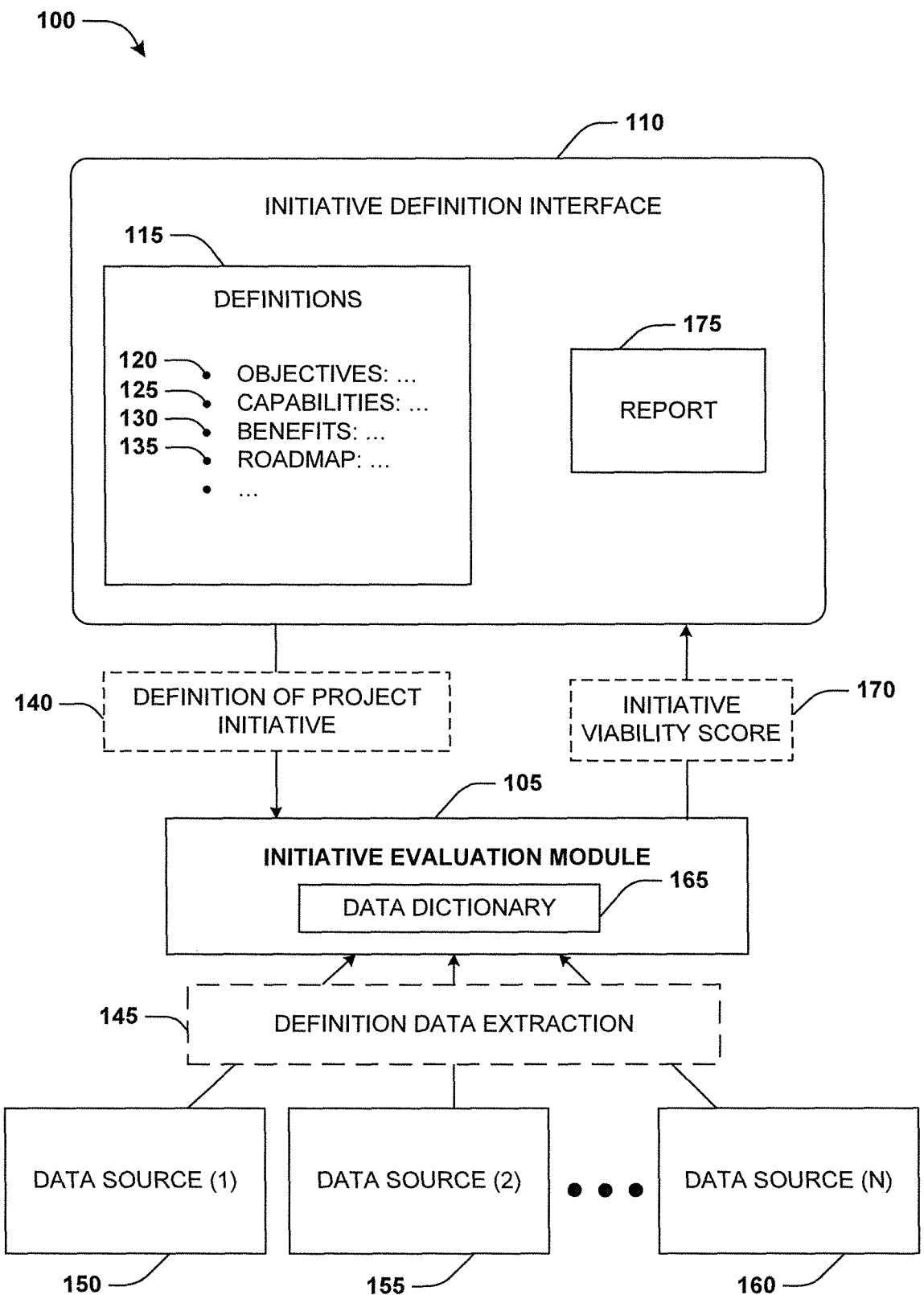
FIG. 1 illustrates an embodiment of a system associated with defining a project initiative through an initiative definition interface.

With reference to FIG. 1, one embodiment of a computer system 100 associated with defining and evaluating a project initiative is illustrated. The system 100 includes an initiative evaluation module 105, which can be configured to execute on a computer, such as computer 715 of FIG. 7. The initiative evaluation module 105 may display an initiative definition interface 110, such as through a display associated with the computer 715. The initiative definition interface 110 may be used by a user to define a project initiative for an entity, such as a technology upgrade initiative for a corporation to implement.

The initiative definition interface 110 may be populated with definition interfaces 115 through which the user may specify definitions used to construct a project initiative definition 140 for the project initiative. In one embodiment, the initiative evaluation module 105 may receive an objective definition 120 of an objective for the entity. In one embodiment, the objective definition 120 may specify information describing an entity revenue increase objective, an entity operational cost reduction objective, and/or a risk mitigation objective.

The initiative evaluation module 105 may receive a capability definition 125 of a capability change to implement by the entity for achieving the objective. In one embodiment, the capability definition 125 may comprise information describing a change in staffing such as hiring 3 new employees, a change in a process implemented by the entity such as a new training class, and/or a change in resources of the entity such as the purchase of new equipment.

The initiative evaluation module 105 may receive a benefit definition 130 of a benefit resulting from implementing the capability change. In one embodiment, the benefit may correspond to an increase in sales personal productivity from hiring 3 new sales employees, training them in a new sales software program, and the purchase of tablets to run the new sales software program.

The initiative evaluation module 105 may receive an implementation roadmap definition 135 of a roadmap of phases of workflow used to accomplish the capability change for achieving the benefit. In one embodiment, the roadmap may specify how a new hire phase will be accomplished, how a purchase and deployment of a new sales software program onto tablets will be accomplished, and how training new sales employees will be accomplished. In this way, the roadmap may specify what actions are to be performed, how to perform those actions, who will perform the actions, deadlines, and/or other information.

In an embodiment, the initiative evaluation module 105 is configured to perform automated data mining operations in order to extract definition data 145 that can be used for auto-populating the definitions of the projective initiative definition 140, such as information that the user may otherwise lack. In one embodiment, the initiative evaluation module 105 may extract the definition data 145 from a first data source 150 such as a website, a second data source 155 such as financial documents, and/or other data sources such as in the data source 160 corresponding to a database of entity operational data. In this way, the initiative evaluation module 105 may extract objective definition data, capability definition data, benefit definition data, and/or implementation roadmap definition data from various data sources to programmatically aid the user in defining the project initiative with information that the user may otherwise lack.

The initiative evaluation module 105, such as through the value meter, is configured to assign ranks to the objective definition 120, the capability definition 125, the benefit definition 130, and the implementation roadmap definition 135 based upon a definition completeness metric. The definition completeness metric may correspond to a level of detail provided for a definition. In one embodiment, a low score such as between about 0 and 1 may be assigned to a definition if there is little to no information provided for the definition. In one embodiment, the objective definition 120 may be left blank or may be populated with a generic non-descriptive statement. A moderate score such as between about 1 and 2 may be assigned to a definition if there is some information for the definition but the definition is not complete. In one embodiment, the implementation roadmap definition 135 may specify what actions are to be performed but does not specify who will perform the actions. A high score such as 2 may be assigned to a definition that is fully defined. In one embodiment, the benefit definition 130 may describe in detail the benefits of each future capability that is to be achieved in order to satisfy the objectives of the entity. It may be appreciated that any value such as a numeric value or other descriptive value may be used as a ranking value.

In an embodiment, the initiative evaluation module 105 may assign a rank to the benefit definition 130 based upon a level of detail describing how the capability change, such as the increase in staff, the software training, and the new sales software loaded onto tablets, will provide an internal rate of return over a payback period from investing in implementing the capability change. The internal rate of return over the payback period may correspond to whether the cost of the project initiative will be recouped within a certain time period such as within 10 months. In another embodiment, the initiative evaluation module 105 may perform a financial benefit calculation by applying the benefit definition 130 to entity operation data of the entity, such as sales data, training costs, new hire costs, etc. The initiative evaluation module 105 may assign the rank to the benefit definition 130 based upon an output of the financial benefit calculation.

In another embodiment, the initiative evaluation module 105 may assign a rank to the implementation roadmap definition 135 based upon whether the implementation roadmap definition 135 comprises information that packages work streams into phases for developing capabilities for the capability change used to achieve the benefit aligned with the objective. In one embodiment, a software purchase phase may specify work streams of how and who will select and purchase the new sales software program, a training phase may specify how and who will train sales employees on the new sales software program, etc.

A rank may comprise a first mapping to an entity reaction metric regarding a reaction of the entity to the project initiative. In one embodiment, if an executive of the organization is predicted to show little interest in the project initiative, then a relatively lower rank may be assigned to the project initiative definition 140. The rank may comprise a second mapping to an approval status metric regarding a likelihood of approval of the project initiative by the entity. In one embodiment, a relatively lower rank may be assigned to the project initiative definition 140 if the corporation is predicted to not approve the project initiative because of various factors such as a lack of benefits, increased risk, increased operating costs, etc.

In another embodiment, the initiative evaluation module 105 may programmatically assign ranks using a data dictionary 165. The data dictionary 165 may comprise phrases such as templates of how a project initiative could be defined, such as "reduce overhead", "hire", "purchase", "mitigate risk", a due date format, a deadline format, an action item format, a person name format for who would take responsibility for various actions and tasks, etc. In one embodiment, the initiative evaluation module 105 may extract text from a definition such as from the objective definition 120. The initiative evaluation module 105 may match the text to entries within the data dictionary 165 to identify a number or percentage of phrases of the text that are mapped to entries within the data dictionary 165. The initiative evaluation module 105 may assign a rank to the definition based upon the number or percentage of phrases that are mapped to entries within the data dictionary 165.

The initiative evaluation module 105, such as through the value meter, may combine the ranks assigned to the definitions of the project initiative definition 140 to generate an initiative viability score 170. The initiative viability score 170 may provide an indication as to how viable, complete, and well-defined the project initiative definition is for the project initiative. The initiative viability score 170 may provide an idea as to how the corporation will react to the project initiative and/or how likely the corporation is to approve the project initiative. In an embodiment, the initiative viability score 170 may be generated based upon an entity impact metric of the project initiative upon the entity, a sponsorship metric of a likelihood of an employee of the entity such as an executive sponsoring the project initiative, and/or a funding adequacy metric of a likelihood of the project initiative receiving adequate funding.

The initiative evaluation module 105 may display a report 175, through the initiative definition interface 110, based upon the initiative viability score 170. In an embodiment, the report 175 may comprise an initiative redefinition suggestion for redefining the project initiative based upon the initiative viability score 170 being below a threshold. In one embodiment, the initiative redefinition suggestion may specify that the objective definition 120 is lacking some information, and thus has an information gap. The initiative evaluation module 105 may evaluate employee data to identify a target user having a role associated with a type of information used to fill the information gap. Accordingly, the initiative evaluation module 105 may suggest an action plan for providing an information request to a computing device of the target user, such as sending an email to an executive planner for the corporation because the executive planner's job title includes defining objectives for the corporation. If the initiative viability score 170 exceeds a threshold, then the report 175 may provide a routing suggestion for routing the project initiative to a computing device of a potential sponsor user for evaluation, such as an email to an executive decision maker that would sponsor the project initiative.

Figure 2:
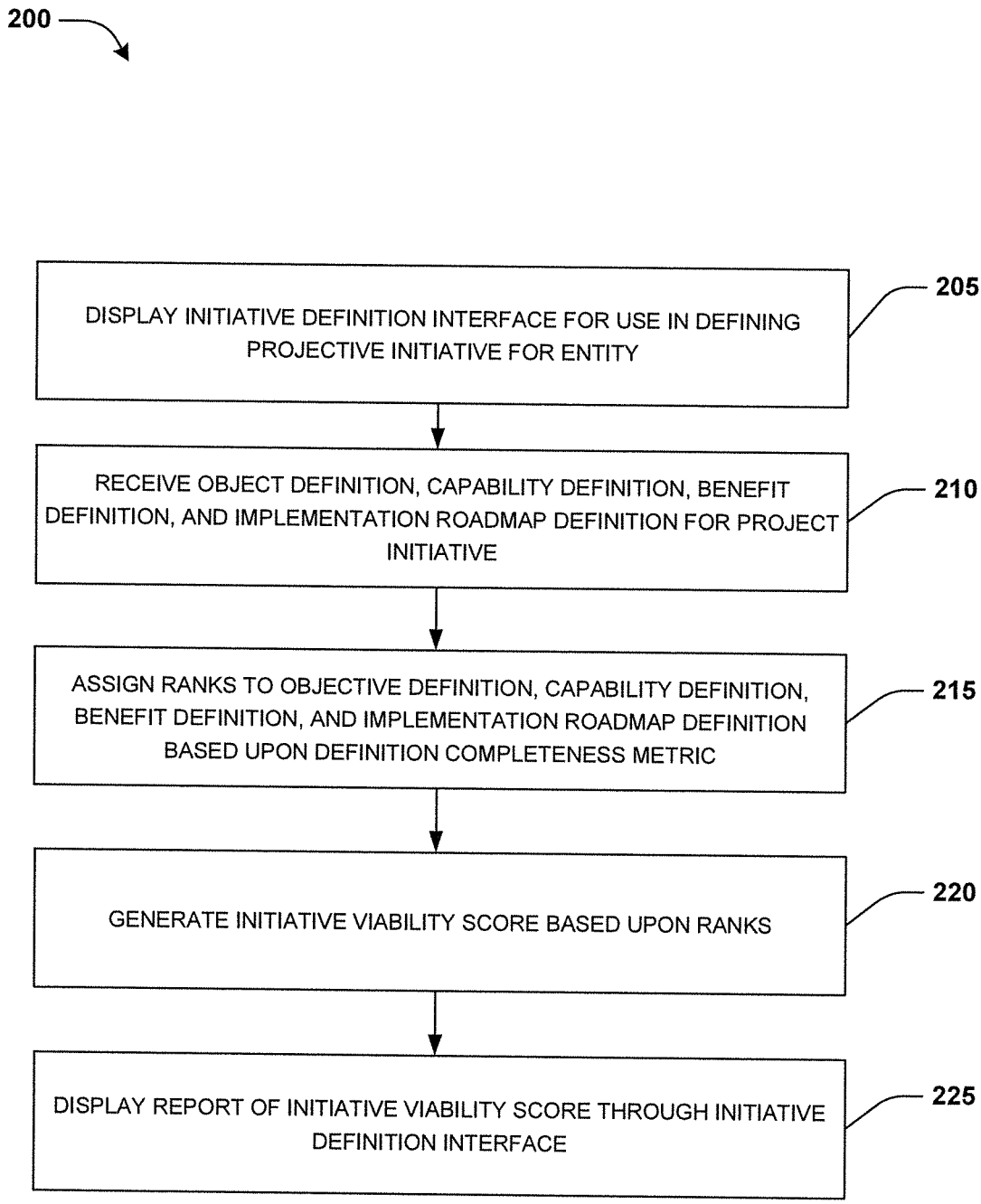
FIG. 2 illustrates an embodiment of a method associated with defining a project initiative.

With reference to FIG. 2, one embodiment of a computer implemented method 200 associated with defining and evaluating a project initiative is illustrated. In one embodiment, the method 200 is performed by the initiative evaluation module 105 utilizing various computing resources of the computer 715, such as the processor 720 for executing instructions associated with displaying the initiative definition interface 110, ranking definitions of a project initiative, generating initiative viability scores, and displaying a report for the project initiative. Memory 735 and/or disks 755 are used for storing definitions, ranks assigned to definitions, an initiative viability score derived from the ranks, and/or other data. Network hardware is used for communicating data structures between the computer 715 and remote computers over a network. The method 200 is triggered upon receipt of a user requesting access to the initiative definition interface 110.

Figure 3:
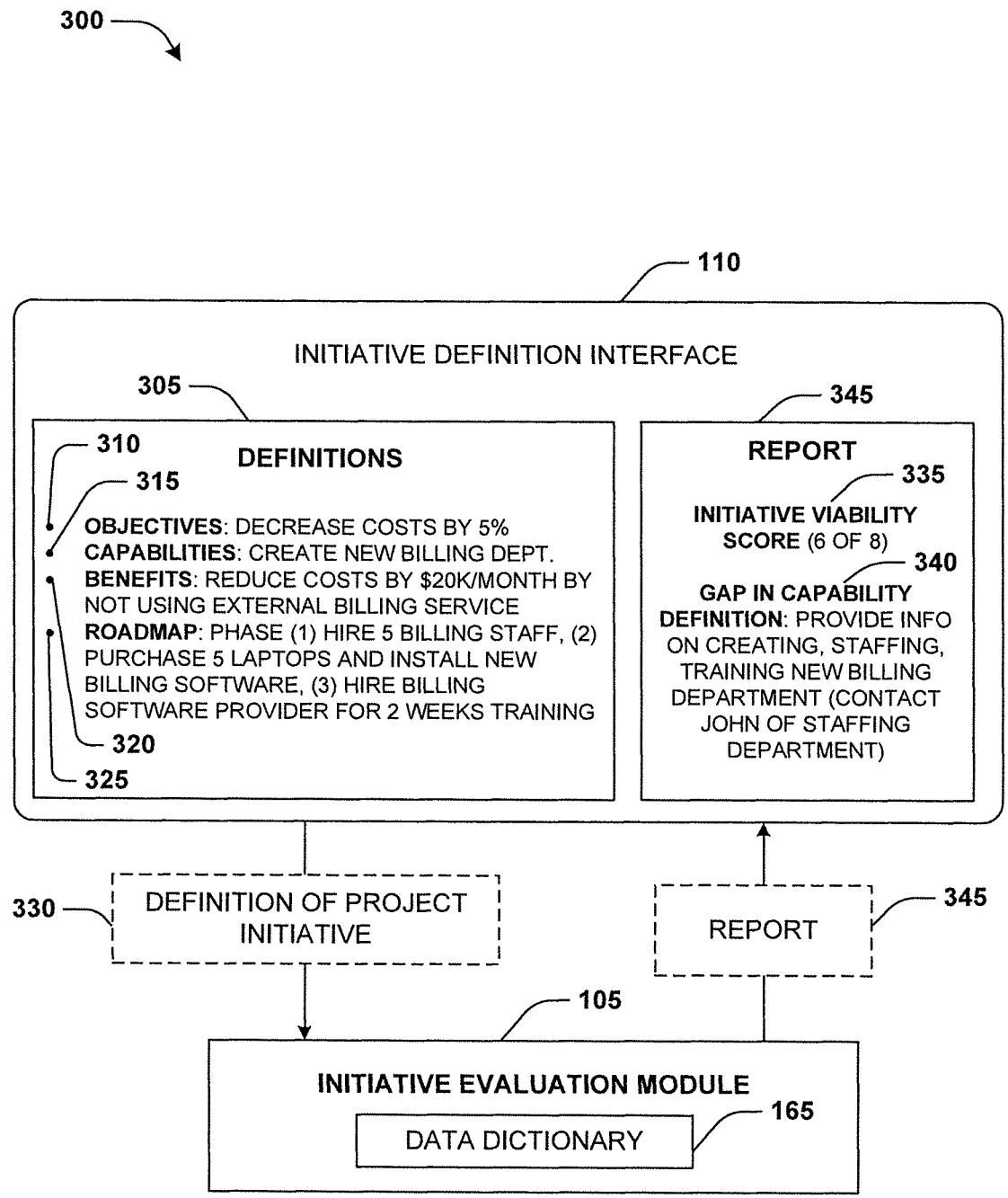
FIG. 3 illustrates an embodiment of a system associated with defining a project initiative, where a report with an initiative viability score and an action plan is provided.

At 205, the initiative definition interface 110, for use in defining a project initiative, may be displayed, as illustrated by FIG. 3 depicting a computer system 300. The initiative definition interface 110 may be populated with definition interfaces 305 through which a user may specify definitions used to construct a project initiative definition 330 for the project initiative. In one embodiment, the user may utilize the initiative definition interface 110 to define a billing project initiative for a corporation to transition from outsourcing billing services to handling billing services internally.

At 210, an objective definition 310, a capability definition 315, a benefit definition 320, and/or an implementation roadmap definition 325 may be received by the initiative evaluation module 105 through the initiative definition interface 110 as the project initiative definition 330. The objective definition 310 may specify an objective to decrease costs of the corporation by 5%, such as costs arising from outsourcing billing services. The capability definition 315 may specify that a new billing department is to be created in order to achieve the objective of the 5% decrease in costs by eliminating the outsourcing of billing services. The benefit definition 320 may specify that costs will be reduced by $20,000 per month by not using the external billing service. The implementation roadmap definition 325 may define a first phase to hire 5 billing staff members, a second phase to purchase 5 laptops and install the laptops with new billing software, and a third phase to hire a billing software provider for 2 weeks of internal training of the 5 billing staff members.

At 215, ranks may be assigned to the objective definition 310, the capability definition 315, the benefit definition 320, and/or the implementation roadmap definition 325 based upon a definition completeness metric corresponding to a level of detail provided for individual definitions of the project initiative definition 330. In an embodiment, the initiative evaluation module 105 may match phrases within the definitions to entries within the data dictionary 165 for assigning ranks based upon how much the phrases match entries. In one embodiment, a rank of 1.5 may be assigned to the objective definition 310 because the objective definition 310 does specify an objective, but that objective is not fully defined. A rank of 0.5 may be assigned to the capability definition 315 because the capability definition 315 specifies a capability that is not well defined and merely describes that a new billing department is to be created without providing additional details regarding the future capability of the new billing department. Ranks of 2 may be assigned to the benefit definition 320 and the implementation roadmap definition 325 because such definitions are well defined.

At 220, the initiative evaluation module 105 may generate an initiative viability score 335 based upon the ranks assigned to the definitions of the project initiative definition 330. In one embodiment, the ranks may be combined into a score of 6 out of 8. The initiative evaluation module 105 may identify an information gap for the capability definition 315. The information gap may specify that more information is needed for how the new billing department will be created (e.g., a location and office space for the new billing department), staffing requirements for the new billing department, how the new billing department will be trained, etc. The initiative evaluation module 105 may create an action plan 340 to contact a user John of a staffing department of the corporation based upon a determination that user John has a role associated with the type of information needed to better define the capability definition 315.

At 225, a report 345 of the initiative viability score 335 may be displayed through the initiative definition interface 110. The action plan 340 may be included within the report 345. In this way, the user may receive an objective report regarding how viable is the project initiative definition 330 and how to improve the project initiative definition 330.

Figure 4:
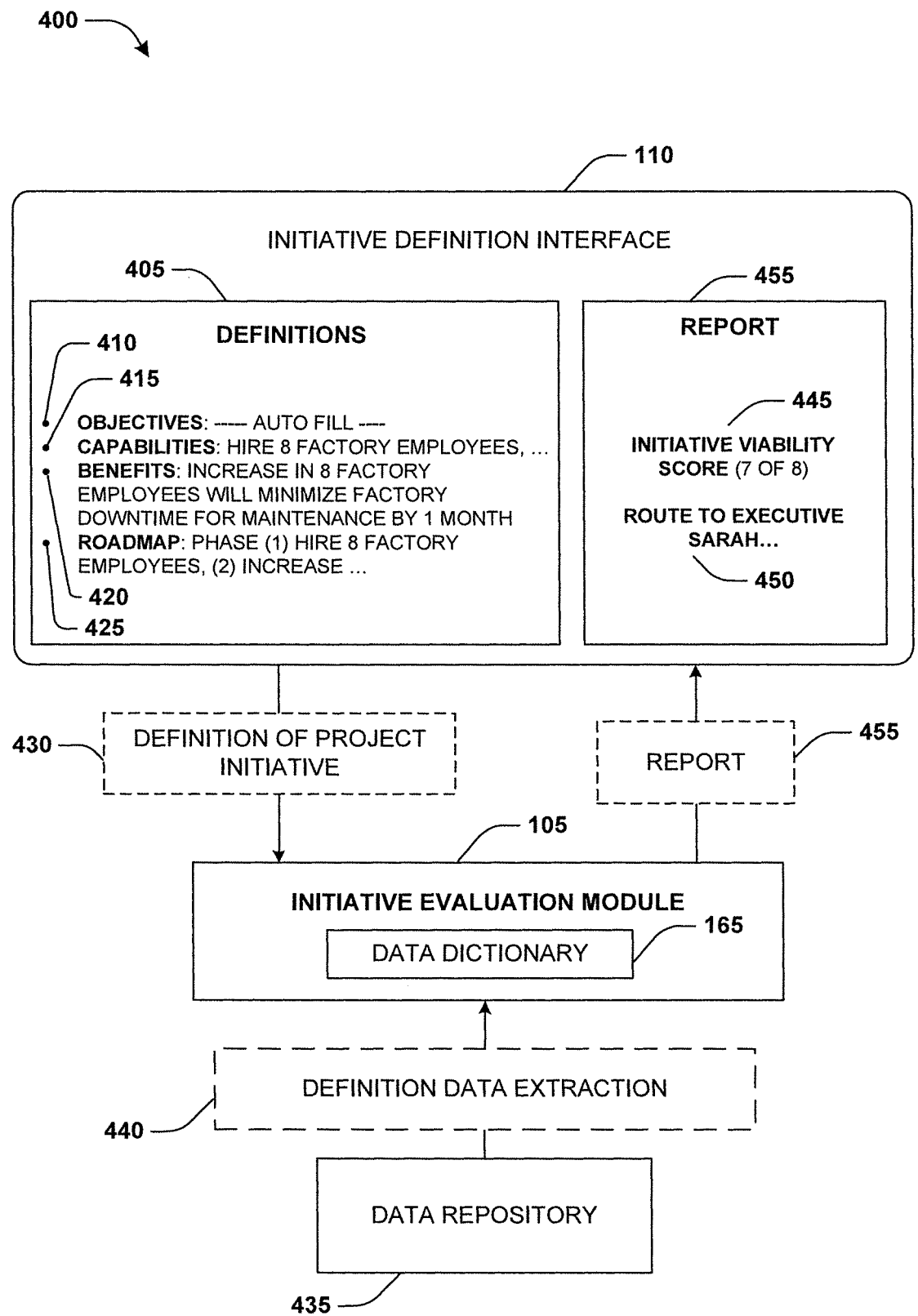
FIG. 4 illustrates an embodiment of a system associated with defining a project initiative, where a report with an initiative viability score and a routing suggestion is provided.

With reference to FIG. 4, one embodiment of a computer system 400 associated with defining and evaluating a project initiative is illustrated. The initiative evaluation module 105 may receive a project initiative definition 430 defined through definition interfaces 405 of the initiative definition interface 110. In one embodiment, a user may set an autofill setting for an objective definition 410. The autofill setting will trigger the initiative evaluation module 105 to perform automated data mining in order to identify and auto populate the objective definition 410 with relevant objective information for a company. The user may specify a capability definition 415 that 8 factory temp employees will need to be hired and/or other future capabilities will be needed in order to minimize factory downtime for maintenance. The user may specify a benefit definition 420 that hiring 8 factory temp employees will minimize factory downtime for maintenance by 1 month. The user may specify an implementation roadmap definition 425 that defines a first phase to hire 8 factory temp employees, a second phase, and/or other phases.

The initiative evaluation module 105 may receive the project initiative definition 430 from the initiative definition interface 110. The initiative evaluation module 105 may perform data mining to access a data repository 435 (e.g., a company database of factory operational data, factory maintenance reports, a website of the company, temp hourly wage statistics, etc.) based upon the autofill setting. The initiative evaluation module 105 may extract 440 objective definition data from the data repository 435, such as information relating to factory operational objectives of the company. The objective definition data may be automatically populated into the objective definition 410 by the initiative evaluation module 105.

The initiative evaluation module 105 may assign ranks to the objective definition 410, the capability definition 415, the benefit definition 420, and/or the implementation roadmap definition 425 based upon a definition completeness metric corresponding to a level of detail provided for individual definitions of the project initiative definition 430. In an embodiment, the initiative evaluation module 105 may match phrases within the definitions to entries within the data dictionary 165 for assigning ranks based upon how much the phrases match entries. In one embodiment, a rank of 2 may be assigned to the objective definition 410 because the initiative evaluation module 105 was able to obtain well defined objective definition data from the data repository 435. A rank of 1 may be assigned to the capability definition 415 because the capability is defined with some specificity but is lacking some details. Ranks of 2 may be assigned to the benefit definition 420 and the implementation roadmap definition 425 because such definitions are well defined.

The initiative evaluation module 105 may generate an initiative viability score 445 based upon the ranks assigned to the definitions of the project initiative definition 430. In one embodiment, the ranks may be combined into a score of 7 out of 8. Because the initiative viability score 445 of 7 out of 8 may exceed a threshold, the initiative evaluation module 105 may evaluate employee data to determine that executive Sarah would be an employee to which the project initiative should be routed for further approval. In this way, a routing suggestion 450 for routing the project initiative to a computing device of executive Sarah (e.g., to an email address of executive Sarah) for evaluation may be created. The initiative evaluation module 105 may generate a report 455 comprising the initiative viability score 445 and the routing suggestion 450. The report 455 may be displayed through the initiative definition interface 110.

Figure 5:
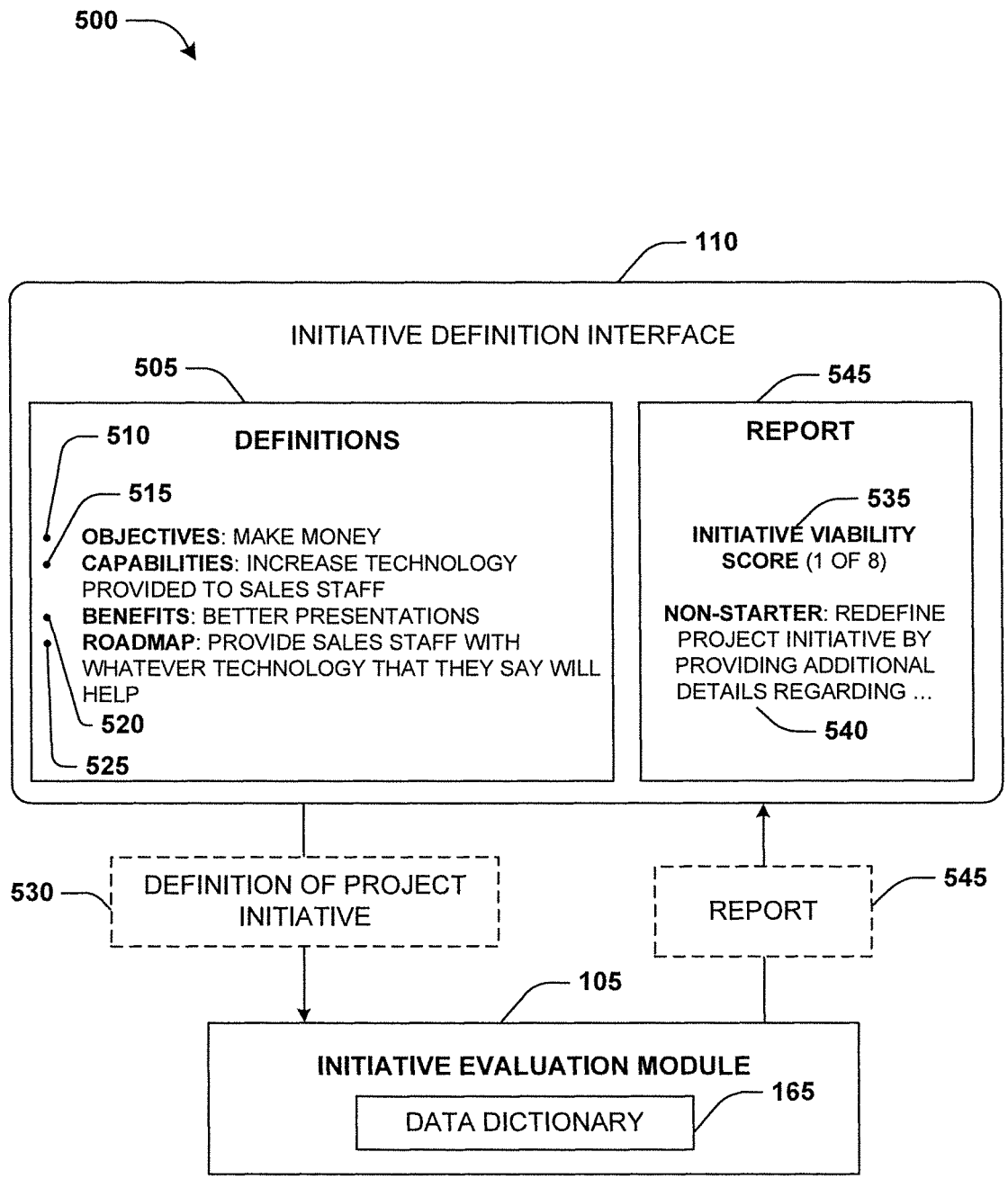
FIG. 5 illustrates an embodiment of a system associated with defining a project initiative, where a report with an initiative viability score and a non-starter message is provided.

With reference to FIG. 5, one embodiment of a computer system 500 associated with defining and evaluating a project initiative is illustrated. The initiative evaluation module 105 may receive a project initiative definition 530 defined through definition interfaces 505 of the initiative definition interface 110. In one embodiment, a user may specify an objective definition 510 of an objective to make money. The user may specify a capability definition 515 to increase technology provided to sales staff. The user may specify a benefit definition 520 specifying that better presentations will be achieved as a benefit from the capability change of increasing technology provided to sales staff. The user may specify an implementation roadmap definition 525 that sales staff is to be provided with whatever technology they say will help.

The initiative evaluation module 105 may receive the project initiative definition 530 from the initiative definition interface 110. The initiative evaluation module 105 may assign ranks to the objective definition 510, the capability definition 515, the benefit definition 520, and/or the implementation roadmap definition 525 based upon a definition completeness metric corresponding to a level of detail provided for individual definitions of the project initiative definition 530. In an embodiment, the initiative evaluation module 105 may match phrases within the definitions to entries within the data dictionary 165 for assigning ranks based upon how much the phrases match entries. In one embodiment, ranks of 0.25 may be assigned to the objective definition 510, the capability definition 515, the benefit definition 520, and the implementation roadmap definition 525 because such definitions are generic and are significantly lacking in information.

The initiative evaluation module 105 may generate an initiative viability score 535 based upon the ranks assigned to the definitions of the project initiative definition 530. In one embodiment, the ranks may be combined into a score of 1 out of 8. Because the initiative viability score 535 of 1 out of 8 is below a threshold, the initiative evaluation module 105 may generate a non-starter message 540 indicating that the project initiative needs to be redefined with additional details regarding certain aspects of the project initiative definition 530. The initiative evaluation module 105 may generate a report 545 comprising the initiative viability score 535 and the non-starter message 540. The report 545 may be displayed through the initiative definition interface 110.

Figure 6:
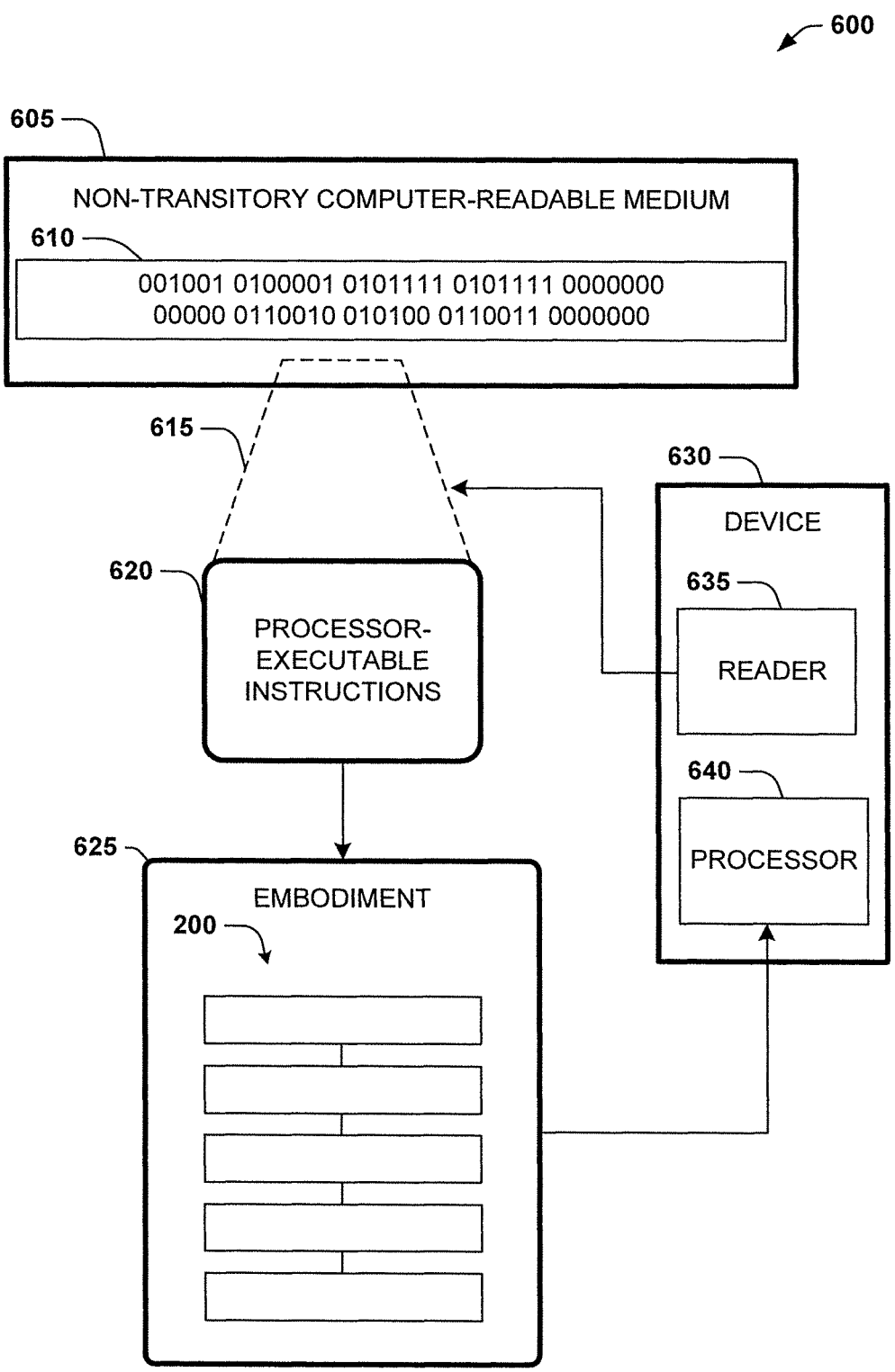
FIG. 6 illustrates an embodiment of a non-transitory computer-readable medium.

FIG. 6 is an illustration of a scenario 600 involving an example non-transitory computer-readable medium 605. In one embodiment, one or more of the components described herein are configured as program modules, such as the initiative evaluation module 105, stored in the non-transitory computer-readable medium 605. The program modules are configured with stored instructions, such as processor-executable instructions 620, that when executed by at least a processor, such as processor 640, cause the computing device to perform the corresponding function(s) as described herein. In one embodiment, functionality of the initiative evaluation module 105, stored in the non-transitory computer-readable medium 605, may be executed by the processor 640 as the processor-executable instructions 620 to perform an embodiment 625 of the method 200 of FIG. 2.

The non-transitory computer-readable medium 605 includes the processor-executable instructions 620 that when executed by a processor 640 cause performance of at least some of the provisions herein. The non-transitory computer-readable medium 605 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 605 stores computer-readable data 610 that, when subjected to reading 615 by a reader 635 of a device 630 (e.g., a read head of a hard disk drive, or a read operation invoked on a solid-state storage device), express the processor-executable instructions 620.

In some embodiments, the processor-executable instructions 620, when executed cause performance of operations, such as at least some of the example method 200 of FIG. 2, for example. In some embodiments, the processor-executable instructions 620 are configured to cause implementation of a system, such as at least some of the example system 100 of FIG. 1, for example.

Figure 7:
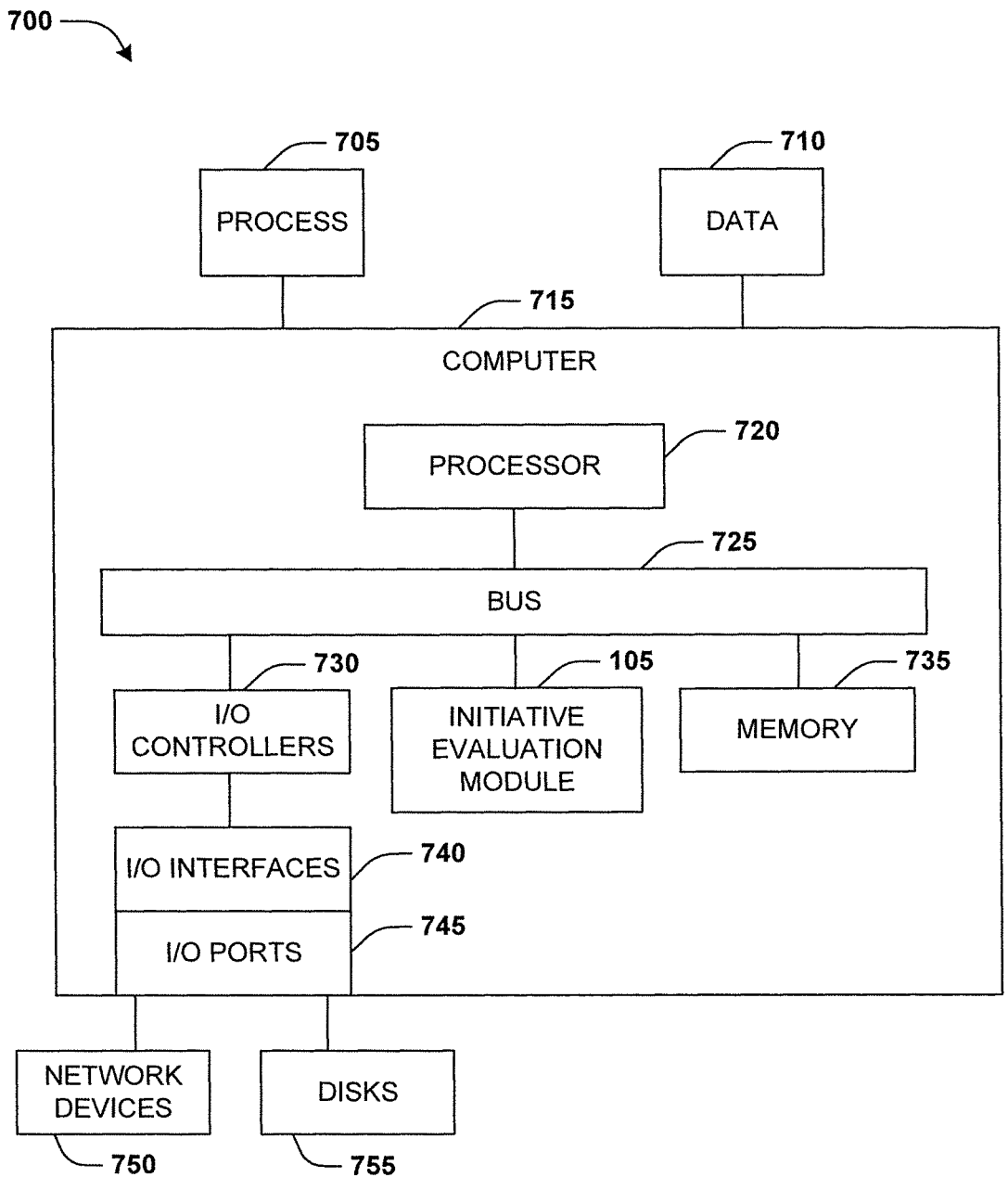
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be the computer 715 that includes a processor 720, a memory 735, and I/O ports 745 operably connected by a bus 725. In one embodiment, the computer 715 may include logic of the initiative evaluation module 105 configured to facilitate the system 100 and/or the method 200 shown in FIGS. 1-2. In different embodiments, the logic of the initiative evaluation module 105 may be implemented in hardware, a non-transitory computer-readable medium 705 with stored instructions, firmware, and/or combinations thereof. While the logic of the initiative evaluation module 105 is illustrated as a hardware component attached to the bus 725, it is to be appreciated that in other embodiments, the logic of the initiative evaluation module 105 could be implemented in the processor 720, stored in memory 735, or stored in disk 755.

In one embodiment, logic of the initiative evaluation module 105 or the computer 715 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 715 as data 710 that are temporarily stored in memory 735 and then executed by processor 720.

The logic of the initiative evaluation module 105 may also provide means (e.g., hardware, non-transitory computer-readable medium 705 that stores executable instructions, firmware) for performing rule based source sequencing for allocation.

Generally describing an example configuration of the computer 715, the processor 720 may be a variety of various processors including dual microprocessor and other multi-processor architectures. The memory 735 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 755 may be operably connected to the computer 715 via, for example, the I/O interface 740 (e.g., card, device) and the I/O ports 745. The disks 755 may be, for example, a magnetic disk drive, a solid state disk drive, a floppy disk drive, a tape drive, a Zip drive, a flash memory card, a memory stick, and so on. Furthermore, the disks 755 may be a CD-ROM drive, a CD-R drive, a CD-RW drive, a DVD ROM, and so on. The memory 735 can store a process, such as within the non-transitory computer-readable medium 705, and/or data 710, for example. The disk 755 and/or the memory 735 can store an operating system that controls and allocates resources of the computer 715.

The computer 715 may interact with input/output (I/O) devices via the I/O interfaces 740 and the I/O ports 745. The I/O devices may be, for example, a keyboard, a microphone, a pointing and selection device, cameras, video cards, displays, the disks 755, the network devices 750, and so on. The I/O ports 745 may include, for example, serial ports, parallel ports, and USB ports. I/O controllers 730 may connect the I/O interfaces 740 to the bus 725.

The computer 715 can operate in a network environment and thus may be connected to the network devices 750 via the I/O interfaces 740, and/or the I/O ports 745. Through the network devices 750, the computer 715 may interact with a network. Through the network, the computer 715 may be logically connected to remote computers (e.g., the computer 715 may reside within a distributed computing environment to which clients may connect). Networks with which the computer 715 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   display an initiative definition interface for use in defining a project initiative for an entity;
   receive, through the initiative definition interface, an objective definition of an objective for the entity, a capability definition of a capability change to implement by the entity for achieving the objective, a benefit definition of a benefit resulting from implementing the capability change, and an implementation roadmap definition of a roadmap of phases of work to accomplish the capability change for achieving the benefit and display each of these definitions within a definitions section of the initiative definition interface, wherein the objective definition comprises information describing an entity revenue increase objective;
   perform an automated data mining operation by evaluating a data source by acquiring additional definition data by auto-populating one or more of the definitions;
   assign ranks to the objective definition, the capability definition, the benefit definition, and the implementation roadmap definition by, for each definition, (i) extracting text from the definition,
(ii) matching the text to a data dictionary to identify a number of phrases of the text that are mapped to entries within the data dictionary, and
(iii) assigning a rank to the definition based upon the number of phrases that are mapped to entries within the data dictionary;

generate an initiative viability score based upon the ranks, an entity impact metric of the project initiative upon the entity, a sponsorship metric of an employee of the entity sponsoring the project initiative, and a funding adequacy metric of a likelihood of the project initiative receiving adequate funding and display the initiative viability score within a report section of the initiative definition interface; and display an initiative redefinition suggestion within the report section of the initiative definition interface for redefining the project initiative based upon the initiative viability score being below a threshold.

2. The non-transitory computer-readable medium of claim 1, wherein the automated data mining operation evaluates the data source to identify additional objective definition data to use for the objective definition.

3. The non-transitory computer-readable medium of claim 1, wherein the automated data mining operation evaluates the data source to identify additional capability definition data to use for the capability definition.

4. The non-transitory computer-readable medium of claim 1, wherein the automated data mining operation evaluates the data source to identify additional benefit definition data to use for the benefit definition.

5. The non-transitory computer-readable medium of claim 1, wherein the automated data mining operation evaluates the data source to identify additional implementation roadmap definition data to use for the implementation roadmap definition.

6. The non-transitory computer-readable medium of claim 1, wherein the computer-executable instructions cause the processor to:
in response to the initiative viability score exceeding the threshold, provide a routing suggestion for routing the project initiative to a computing device of a user for evaluation.

7. The non-transitory computer-readable medium of claim 1, wherein the computer-executable instructions cause the processor to:
evaluate the objective definition, the capability definition, the benefit definition, and the implementation roadmap definition to identify an information gap of the project initiative; and
provide a notification, through the initiative definition interface, of the information gap.

8. The non-transitory computer-readable medium of claim 7, wherein the computer-executable instructions cause the processor to:
identify a user having a role associated with a type of information that will fill the information gap; and
suggest an action plan for providing an information request to a computing device of the user.

9. A computing system, comprising:
a processor connected to memory; and
an initiative evaluation module stored on a non-transitory computer readable medium and configured with instructions that when executed by the processor cause the processor to:
display an initiative definition interface for use in defining a project initiative for an entity;
identify an objective definition of an objective for the entity, a capability definition of a capability change to implement by the entity for achieving the objective, a benefit definition of a benefit resulting from implementing the capability change, and an implementation roadmap definition of a roadmap of phases of work to accomplish the capability change for achieving the benefit and display each of these definitions within a definitions section of the initiative definition interface, wherein the objective definition comprises information describing an entity revenue increase objective;
perform an automated data mining operation by evaluating a data source by acquiring additional definition data by auto-populating one or more of the definitions;
assign ranks to the objective definition, the capability definition, the benefit definition, and the implementation roadmap definition by, for each definition,
(i) extracting text from the definition,
(ii) matching the text to a data dictionary to identify a number of phrases of the text that are mapped to entries within the data dictionary, and
(iii) assigning a rank to the definition based upon the number of phrases that are mapped to entries within the data dictionary;
generate an initiative viability score based upon the ranks, an entity impact metric of the project initiative upon the entity, a sponsorship metric of an employee of the entity sponsoring the project initiative, and a funding adequacy metric of a likelihood of the project initiative receiving adequate funding and display the initiative viability score within a report section of the initiative definition interface; and
display an initiative redefinition suggestion within the report section of the initiative definition interface for redefining the project initiative based upon the initiative viability score being below a threshold.

10. The computing system of claim 9, wherein the objective definition comprises information describing at least one of an entity operating cost reduction objective or a risk mitigation objective.

11. The computing system of claim 9, wherein the instructions for assigning ranks comprise instructions to cause the processor to:
assign a rank to a definition based upon a level of detail provided through the definition to define the project initiative.

12. The computing system of claim 9, wherein the capability definition comprises information describing at least one of a change in staffing, a change in a process implemented by the entity, or a change in resources of the entity.

13. The computing system of claim 9, wherein the instructions for assigning ranks comprise instructions to cause the processor to:
assign a rank to the benefit definition based upon a level of detail describing how the capability change will provide an internal rate of return over a payback period from investing in implementing the capability change.

14. The computing system of claim 9, wherein the instructions for assigning ranks comprise instructions to cause the processor to:
perform a financial benefit calculation by applying the benefit definition to entity operating data of the entity; and
assign a rank to the benefit definition based upon an output of the financial benefit calculation.

15. A computer-implemented method, the computer-implemented method involving a computing device comprising a processor, and the computer-implemented method comprising:
  displaying, by the processor, an initiative definition interface for use in defining a project initiative for an entity;
  receiving, by the processor, through the initiative definition interface, an objective definition of an objective for the entity, a capability definition of a capability change to implement by the entity for achieving the objective, a benefit definition of a benefit resulting from implementing the capability change, and an implementation roadmap definition of a roadmap of phases of work to accomplish the capability change for achieving the benefit and displaying each of these definitions within a definitions section of the initiative definition interface, wherein the objective definition comprises information describing an entity revenue increase objective;
  performing an automated data mining operation by evaluating a data source by acquiring additional definition data by auto-populating one or more of the definitions;
  assigning, by the processor, ranks to the objective definition, the capability definition, the benefit definition, and the implementation roadmap definition by, for each definition,
    (i) extracting, by the processor, text from the definition,
    (ii) matching, by the processor, the text to a data dictionary to identify a number of phrases of the text that are mapped to entries within the data dictionary, and
    (iii) assigning, by the processor, a rank to the definition based upon the number of phrases that are mapped to entries within the data dictionary;
  generating, by the processor, an initiative viability score based upon the ranks, an entity impact metric of the project initiative upon the entity, a sponsorship metric of an employee of the entity sponsoring the project initiative, and a funding adequacy metric of a likelihood of the project initiative receiving adequate funding and displaying the initiative viability score within a report section of the initiative definition interface; and
  displaying, by the processor, an initiative redefinition suggestion within the report of the initiative viability score through the initiative definition interface.

16. The computer-implemented method of claim 15, the assigning ranks further comprising:
  assigning, by the processor, a rank to the implementation roadmap definition based upon whether the implementation roadmap definition comprises information that packages work streams into phases for developing capabilities for the capability change used to achieve the benefit aligned with the objective.

17. The computer-implemented method of claim 15, wherein a rank has a first mapping to an entity reaction metric regarding a reaction of the entity to the project initiative and a second mapping to an approval status metric regarding a likelihood of approval of the project initiative by the entity.

18. The non-transitory computer-readable medium of claim 1, wherein the computer-executable instructions cause the processor to:
  assign a rank based on a completeness metric indicating a level of detail provided to each of the objective definition, the capability definition, the benefit definition, and the implementation roadmap definition, wherein the assigned rank is (i) a low score where little to no information is provided for the definition, (ii) a moderate score where some information is provided for the definition but the definition is not complete, and (iii) a high score where the definition is fully defined;
  select the lowest-ranked definition as having an information gap of the project initiative; and
  display a notification, through the initiative definition interface, of the information gap.

19. The non-transitory computer-readable medium of claim 18, wherein the computer-executable instructions cause the processor to programmatically assign the rank for each definition by:
  matching phrases within the definition to entries within a data dictionary;
  determining a percentage or number of phrases that map to the entries; and
  assigning the rank to the definition based on the number or percentage.

* * * * *